(12) United States Patent
Marcu et al.

(10) Patent No.: US 8,209,439 B2
(45) Date of Patent: Jun. 26, 2012

(54) MANAGING MULTIPLE CONCURRENT OPERATIONS WITH VARIOUS PRIORITY LEVELS IN A LOCAL STORAGE DEVICE

(75) Inventors: Alon Marcu, Tel Mond (IL); Nir Perry, Holon (IL)

(73) Assignee: SanDisk IL Ltd., Kfar Saba (IL)

( * ) Notice: Subject to any disclaimer, the term of this patent is extended or adjusted under 35 U.S.C. 154(b) by 521 days.

(21) Appl. No.: 12/198,546

(22) Filed: Aug. 26, 2008

(65) Prior Publication Data
US 2010/0049913 A1 Feb. 25, 2010

Related U.S. Application Data

(60) Provisional application No. 61/091,634, filed on Aug. 25, 2008.

(51) Int. Cl.
*G06F 3/00* (2006.01)
*G06F 13/12* (2006.01)
*G06F 13/38* (2006.01)

(52) U.S. Cl. .............................................. 710/6; 710/74
(58) Field of Classification Search .................... 710/74, 710/6
See application file for complete search history.

(56) References Cited

U.S. PATENT DOCUMENTS

| | | | | |
|---|---|---|---|---|
| 5,550,848 | A | * | 8/1996 | Doshi et al. .................... 714/749 |
| 6,392,925 | B2 | * | 5/2002 | Jha et al. .................... 365/185.04 |
| 6,408,357 | B1 | * | 6/2002 | Hanmann et al. ............... 711/113 |
| 2005/0144367 | A1 | * | 6/2005 | Sinclair .......................... 711/103 |
| 2006/0022054 | A1 | * | 2/2006 | Elhamias et al. ............... 235/492 |
| 2007/0239926 | A1 | | 10/2007 | Gyl et al. |
| 2008/0126844 | A1 | * | 5/2008 | Morita et al. ....................... 714/6 |

* cited by examiner

*Primary Examiner* — Chun-Kuan Lee
*Assistant Examiner* — Farley Abad
(74) *Attorney, Agent, or Firm* — Beyer Law Group LLP

(57) ABSTRACT

Techniques for rendering the management of processes supported by a storage device are described. In particular, the efficient allocation of storage array processing resources when managing concurrent processes on a storage array is described.

39 Claims, 6 Drawing Sheets

Table 1
QoS Parameters

| Supported functions | Example of command | Priority level |
|---|---|---|
| Legacy mass storage | Read sector | 3 |
| | Write sector | 3 |
| | Erase range of sectors | 3 |
| Demand-paging | Fetch code page | 1 |
| SSI | Read from socket and write to flash | 2 |
| | Read from Flash and write to socket | 2 |

Fig. 5

MANAGING MULTIPLE CONCURRENT OPERATIONS WITH VARIOUS PRIORITY LEVELS IN A LOCAL STORAGE DEVICE

CROSS-REFERENCE TO RELATED APPLICATION

This application claims priority under 35 USC 119(e) to U.S. Provisional Application No. 61/091,634 filed Aug. 25, 2008 and is hereby incorporated by reference in its entirety.

BACKGROUND OF THE INVENTION

1. Field of the Invention

The invention relates to memory systems and, more particularly, to managing concurrent access to memory systems.

2. Description of the Related Art

In order to assure the coherency of data stored in a mass storage device as well as to avoid conflicts, current memory controllers are only allowed to perform one memory access operation at a given time on a given memory device. In particular, different type memory devices attempt to avoid conflicts in different ways. For example, a NAND device, the host device is the only agent with the ability to stop a currently executing transaction and to initiate the execution of another transaction. However, with SD/MMC devices, the host device sends a request and software internal to the SD/MMC handles the request from the host device whether or not the current process is to be halted while the requested process is be executed. In this situation, the internal software is provided a relatively long time out in order to perform other functions (such a maintenance operations) as well as arbitrate process execution. Unfortunately, these long time outs do not meet the fast responses required for some use cases, such as demand paging. Demand paging refers to the situation that stems from the fact that in order to preserve memory resources, pages of data are only copied from data storage to RAM as they are needed by the processor executing an application.

In some situations, it may be very disadvantageous to completely preclude any other access to the memory device in those situations where there is an ongoing READ or WRITE operation. One example of such a situation where read latency is critical is demand paging since demand paging requires that read and write processes have continuous access to data stored in memory. In NAND flash memory systems, demand paging is commonly used, however, since read and write operations cannot be performed simultaneously, each page retrieval operation will block the whole system until the page is fully loaded thereby greatly slowing down application execution.

There have been a number of attempts at resolving this problem. For example, some systems rely on queuing up the demand paging request until an ongoing read or write operation is complete. This approach, however, is not compatible with the immediate response required to service the demand paging request. For the protocols/buses that support 'stop' of current operations (in event a request of higher priority has been identified), issuing the stop command to halt execution of a given process and only then servicing the (urgent) demand page request can take a long time. Again the urgency of the demand page request is compromised as is the overall performance of the system. Another well known approach relies upon intelligent queuing based on recognition of the priority ('prioritized queue'). However, these systems do not address the issue of treating an urgent request that was not anticipated, i.e., one that requires a guaranteed real-time response and received in the midst of another operation of lower priority.

This problem is increasingly acute in the context of storage device concurrently supporting different functionality/logical protocols with each requiring different system level priority. For example, embedded storage devices (embedded SD) have legacy mass storage commands that coexist with OS code image demand-paging fetches that are conveyed over the same physical storage bus. Other examples include legacy mass storage commands (e.g. SD read/write commands) coexisting with TCP/IP interactions that are conveyed over the same physical storage bus as well as any combination of legacy mass storage devices coexisting with both demand paging and TCP/IP interactions.

Therefore improving the management of concurrent operations with various priority levels in a data storage device is highly desirable.

SUMMARY OF THE INVENTION

The invention can be implemented in numerous ways, including at least as a method, system, and device. Several embodiments of the invention are discussed below.

As a memory product, one embodiment of the invention describes a memory device having at least a data storage array and a data storage array manager arranged to manage the data storage array based upon an operating contract established between the memory device and a host device in communication with the memory device, wherein a pending management command corresponding to a requested data storage array process received by the memory device from the host device is managed by the data storage array manager based upon relevant terms of the operating contract.

In other aspects of the invention, selected terms of the operating contract are not negotiable.

As a system, one embodiment of the invention includes at least: a host device and a memory device in communication with the host device. The memory device in turn includes at least a data storage array and a data storage array manager arranged to manage the data storage array based upon an operating contract established between the memory device and the host device, wherein a pending management command corresponding to a requested data storage array process received by the memory device from the host device is managed by the data storage array manager based upon relevant terms of the operating contract.

In another embodiment, a method of managing concurrent operations with various priority levels in a local storage device is described. The local storage device includes at least a data storage array and a data storage array manager. The method can be carried out by performing at least the following operations: managing the data storage array based upon an operating contract established between the memory device and a host device in communication with the memory device, wherein a pending management command corresponding to a requested data storage array process received by the memory device from the host device is managed by the data storage array manager based upon relevant terms of the operating contract.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5 shows Table 1 delineating certain QoS parameters.

DETAILED DESCRIPTION OF THE EMBODIMENTS

Figure 1:
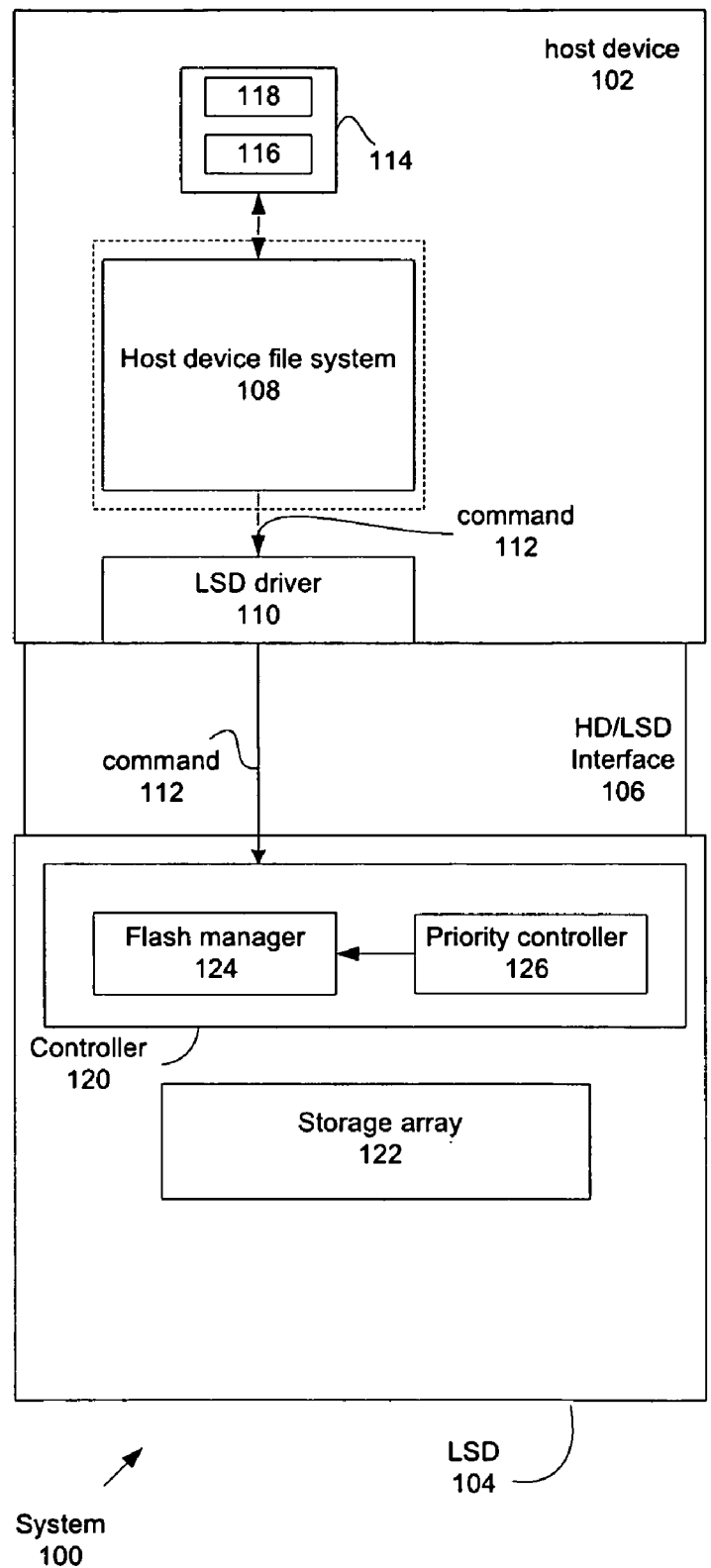
FIG. 1 is a block diagram of a memory system according to one embodiment of the invention.

According to different embodiments, various methods, devices and systems are described for providing storage services, examples of which are illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The exemplary embodiments can pertain to an electronic system that includes a memory device discussed above. Memory devices (i.e., memory cards) are commonly used to store digital data for use with various electronics products. The memory device is often removable from the electronic system so the stored digital data is portable. The memory devices according to such embodiments can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices) and so on. The local storage device described herein may be compatible with any memory card format, such as a secured digital (SD) memory card format used for managing digital media such as audio, video, or picture files. The storage device may also be compatible with a multi media card (MMC) memory card format, a compact flash (CF) memory card format, a flash PC (e.g., ATA Flash) memory card format, a smart-media memory card format, or with any other industry standard specifications. One supplier of these memory cards is SanDisk Corporation of Milpitas, Calif. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it being a flash memory or another type of memory. The storage device may also be implemented with a one-time programmable (OTP) memory chip and/or with a 3 dimensional memory chip technology.

Host systems with which such memory cards are used include personal computers, notebook computers, hand held computing devices, cellular telephones, cameras, audio reproducing devices, and other electronic devices requiring removable data storage. Flash EEPROM systems are also utilized as bulk mass storage embedded in host systems. The storage device may be part of a local proxy system that may be implemented on PDAs (Personal Digital Assistants), mobile handsets, and other various electronic devices. A PDA is typically known as user-held computer systems implemented with various personal information management applications, such as an address book, a daily organizer, and electronic notepads, to name a few.

In the described embodiments, the described systems can include mobile devices (e.g., portable media devices) can communicate with one another. This type of communication can be referred to as peer-to-peer interaction. In this regard, one mobile device can communicate (e.g., unicast) directly with another mobile device. In another example, one mobile device can communicate (e.g., broadcast, anycast or multicast) to a plurality of other mobile devices. In the peer-to-peer environment, one mobile device can communicate with one or more other electronic devices (whether mobile or stationary) in the immediate vicinity. Data sharing can be performed when such communication is available.

Embodiments of the invention are discussed below with reference to FIGS. 1-5. However, those skilled in the art will readily appreciate that the detailed description given herein with respect to these figures is for explanatory purposes as the invention extends beyond these limited embodiments. It should be noted that any functional blocks or functional arrangements described herein can be implemented as either a physical entity or as a logical entity, or as a combination of both.

FIG. 1 is a block diagram of a computing system 100 according to one embodiment of the invention. The system 100 is, for example, associated with a memory card (such as a plug-in card), a memory stick, or some other data storage product. Examples of a memory card include PC Card (formerly PCMCIA device), Flash Card, Flash Disk, Multimedia Card, and ATA Card. The computing system 100 can also be referred to as a memory product or a removable data storage product. The computing system 100 includes host device (HD) 102 and local storage device (LSD) 104. For example, the host 102 can be a computing device, such as a personal computer. In particular, the LSD 104 stores data that can be utilized by the host 102. LSD 104 may communicate with HD 102 by way of HD/LSD interface 106. It should be noted that HD/LSD interface 106 may be configured as a mechanical entity (such as a socket or interconnecting bus) into which HD 102 and LSD 104 may mechanically connect. However, in some embodiments, HD/LSD interface 106 may take the form of a wireless interface. While HD 102 necessarily includes a processor, for the sake of clarity, the processor included in HD 102 is neither shown nor mentioned further in this discussion but is, nonetheless, presumed to be present. HD 102 includes a host device file system (HDFS) 108 in communication with LSD driver 110.

In the described embodiment, HDFS 108 can issue LSD management command 112 to LSD driver 110. LSD driver 110 can, in turn, pass LSD management command 112 to LSD 104 by way of HD/LSD interface 106. For example, LSD management command 112 can take the form of a block command in those cases where LSD 104 is configured to include a data storage array having a block architecture (such as logical block address or LBA architecture). HD 102 can also include software application 114 that can utilize HDFS 108 and LSD driver 110 to communicate with LSD 104. Such software applications can include host device operating system (HDOS) 116 and application 118 each of which typically resides in host device main memory (that can take the form of a hard disk drive, or HDD, as well as non-volatile memory such as FLASH memory).

LSD 104 can include memory controller 120 and storage array 122 that can provide an array of data storage elements that provide non-volatile digital data storage. In one embodiment, the data storage elements are electrically programmable and electrically erasable, such as EEPROM or Flash devices. For example, the data storage elements can be based on floating-gate devices. Memory controller 120 is also often a separate semiconductor die, chip or product. Included in or associated with memory controller 120, flash manager 124 can manage storage array 122 acting at the behest of HDFS 108 and according to commands issued by HDFS 108. More specifically, flash manager 124 may be configured to translate physical/array level flash commands to logical block/sector level commands and vice versa. Controller 120 also include operations contract manager 126 used to provide and/or enforce a operations contract having contract terms that include, for example, priority levels for selected commands issued by HDFS 108 described in more detail below. In some embodiments, it may be suitable to include a assign a priority manager arranged to monitor and enforce terms of the operations contract pertaining to process priority levels. In any case, operations contract manager 126 is well suited to strictly enforce every provision and specific terms of the operations contract. It should be noted that some or all of the terms of the operations contract can be negotiated between the HD 102 and the LSD 104 during a negotiation session that can be held at any appropriate time. However, in some cases, some or all of the terms of the operations contract are non-negotiable meaning that the non-negotiable terms are not subject to negotiation. In such a case, the non-negotiable terms are a "hard-wired" aspect of the operations of either HD 102 or LSD 104. By hard wired it is meant that terms so described are an immutable characteristic of the particular device in question. In this way, there may not be a negotiation session held if it is determined that a pre-existing operations contract (held by either HD 102 or LSD 104) has substantially all its terms being non-negotiable or at least that the terms of interest for a particular negotiation session are non-negotiable. In the context of this discussion, any non-negotiable term is referred to as a static term and any operations contract that in to-to is non-negotiable is referred to as a static operations contract.

In the described embodiment, memory controller 120 can provide HD 102 with read-while-write access or storage array 122 as well as suspend capabilities whereby a current storage array process can be suspended for another process of higher priority. For example, a write/erase process can be suspended or aborted altogether in order for memory controller 120 to execute a read process with higher priority. It should be noted, however, that the read process should be completed before resuming the lower priority process.

In order to implement the described embodiment, each memory process of computing system 100 can be provided operational constraints based upon the terms of the current operations contract (be it a negotiated contract or a static contract). The operational constraints can include, for example, a priority level and guaranteed ready time from freeze, or an associated set of QoS parameters. Such QoS parameters can include those listed on Table 1 shown in FIG. 5. In the described embodiment, if the at least some of the terms of the operations contract are negotiable terms, then the LSD 104 and HD 102 can negotiate specific terms at any appropriate period of time. For example, the negotiation of terms can be held during what is referred to as a handshake phase. During the handshake phase, HD 102 and LSD 104 establish a common operational protocol based upon the set of established operations parameters (that can be implemented by operations contract manager 126 operating on Flash manager 124) or set of operational instructions, under which the system 100 will operate. For example, during this handshake phase, HD 102 and LSD 104 can negotiate and set priority levels and required guaranteed read times for each of the functions supported by storage device 100. Such functions can include, for example, demand paging, legacy mass storage operations, and TCP/IP in those storage systems so enabled. In some embodiments, there is no true negotiation between HD 102 and LSD 104 since the supported functions, priority levels, and guaranteed ready times are pre-defined in an associated specification stored locally in either HD 102 or LSD 104 or otherwise readily available in support documentation associated with HD 102 or LSD 104. It should be noted that the terms of the agreed upon operations contract (be it negotiated or apriori determined) can define different QoS parameters (e.g. latency, performance) for the same operation (e.g., write sector). In this way, HD 102 or LSD 104 can have the option of choosing which QoS parameter value will provide the best response. For example, HD 102 can choose to reduce the performance of normal sector write operation in order to get very fast "write stop response".

The handshake phase can occur, for example, when storage device 100 is powered up, reset, or it is otherwise determined that either the set of supported functions, their associated priority levels and/or guaranteed ready times needs to be updated or otherwise revised. For example, the handshake phase can occur at the initialization of LSD 104. The handshake phase can also occur whenever HD 102 (or LSD 104 for that matter) decides that a new negotiation is required. Thus a new negotiation can take place when, for example, an applet/application is added to the host platform or on LSD 104. A new negotiation can also be prompted by quality of service (QoS) considerations such as a change in the flash error rate that may influence ready time. QoS refers to the level of quality of service (i.e. the guaranteed service quality) of operational metrics such as, for example high bit rate, low latency and low bit error probability to name a few.

Other QoS parameters are listed in Table 1 shown in FIG. 5. A new negotiation can also be prompted by a change of functionality performed by LSD 104. For example, if subsequent to an initial negotiation between LSD 104 and HD 102 an additional functionality (such as enabling TCP/IP) is enabled at LSD 104, then either HD 102 or LSD 104 can prompt a new negotiation taking into account the new functionality. Therefore any time either HD 102 or LSD 104 perceive any change that can affect performance, then either HD 102 or LSD 104 can prompt a new negotiation session during runtime.

It should be noted that the negotiation between HD 102 and LSD 104 is based upon a number of internal constraints known to HD 102. Such constraints include, for example, the minimum treatment time for freezing (or aborting) any of the supported functions, and the maximum performance (e.g., MB/s, latency) for treating any of the supported functions. Furthermore, the negotiation can also be based upon, in part, the relation expressing the tradeoff between treatment time and performance level. For example, reducing the treatment time down to a minimum treatment time may only be achieved only at the expense of decreasing the performance level. In another embodiment, LSD 104 can present HD 102 a number of choices that can be selected by HD 102. For example, LSD 104 can present a requested function and then a list of associated treatment times and corresponding performance factors (i.e., decreasing treatment time can degrade performance, and vice versa). In this way, HD 102 can select the appropriate combination of function, treatment times and corresponding performance factors.

In the described embodiment, HDFS 108 can dynamically interact with any relevant modules (e.g., HDOS 116 or application 118) for instructions regarding their particular needs/constraints (such constraints can include, for example, internal management of their buffers in RAM). Once the modules communicate their particular needs/constraints, HDFS 108 can negotiate with LSD 104 in order to have these needs/constraints reflected in the established priority table implemented by operations contract manager 126.

Figure 2A:
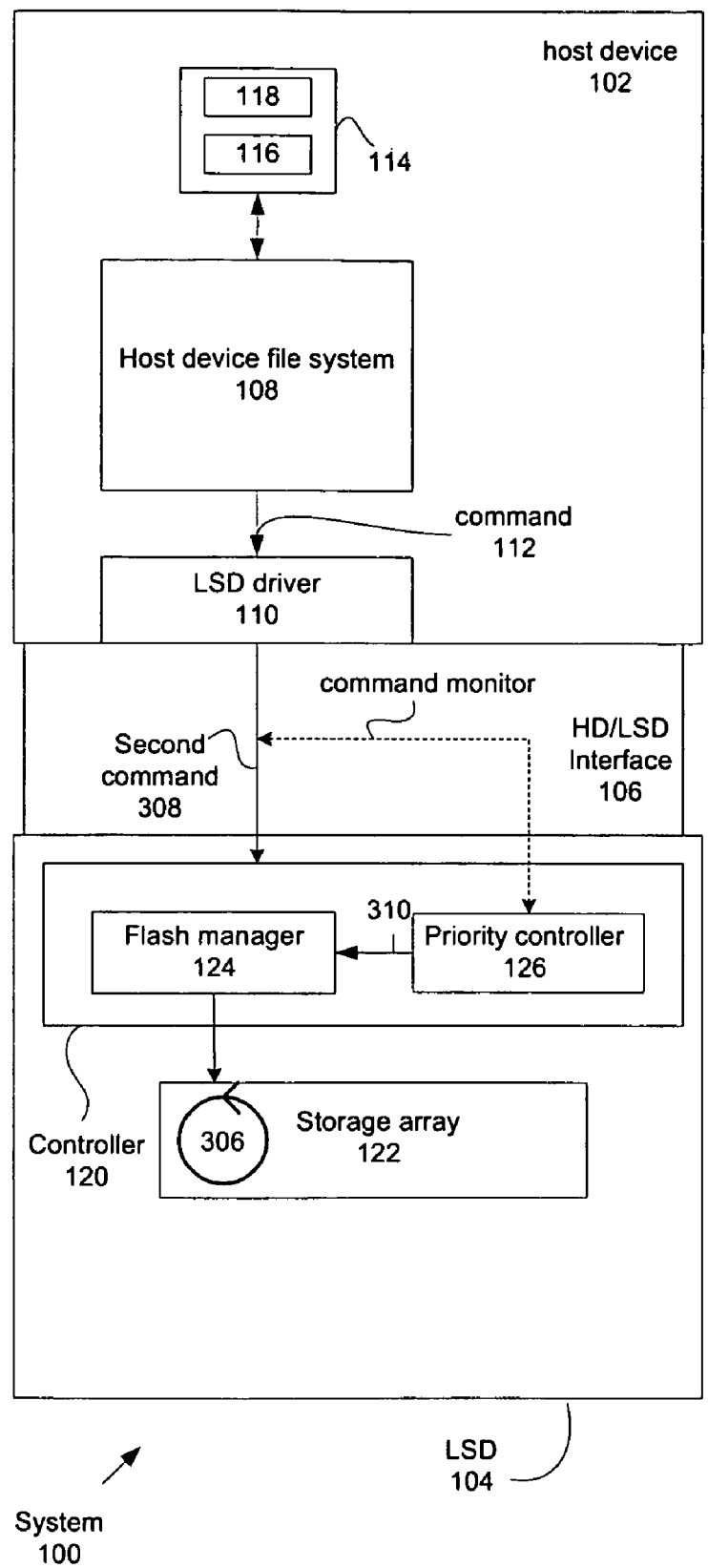
FIGS. 2A and 2B illustrate an operational diagram of computing system shown in FIG. 1.

FIG. 2A illustrates an operational diagram of computing system 100 in accordance with the described embodiments. During a negotiation session (that can occur during an initial handshake or during runtime) a list of functions 302 supported by LSD 104 can be passed to HD 102. In addition to the functions supported by LSD 104, any functions requested by application 114 can also be included in list 302. In this way, HD 102 can interact dynamically with application 114 in order to be made aware of their requirements. Therefore, once negotiation between HD 102 and LSD 104 is complete, application 114 can optionally update their own internal management according to the results of the negotiation by, for example, allocating additional buffers. In this way, a more integrated approach can be taken in that all functions can be considered during the negotiation between HD 102 and LSD 104. Functions to be considered include, for example, legacy storage device functions such as read, write, erase, etc. as well as demand paging and any storage service functions. It should be noted that in some cases, the negotiation between HD 102 and LSD 104 can be limited to exchanging a pre-defined set of priorities 304 that can be stored in either HD 102 or storage array 122 made available to HD 102.

Once the negotiation has been successfully completed, operations contract manager 126 can monitor the activity of storage array 122. Such monitoring of storage array 122 can include QoS monitoring and monitoring of any active process 306. Furthermore, operations contract manager 126 can also monitor any pending storage array access requests. It should be noted, however, that monitoring can be performed by HD 102 in which case pertinent information can be forwarded to operations contract manager 126. In the event that LSD 104 is currently servicing active process 306 on storage array 122 and pending request 308 associated with process 310 having priority 312 is received by LSD 104 (or generated by HDFS 108 in which case HD 102 would forward the information to operations contract manager 126), operations contract manager 126 can monitor request 308 for at least the priority level 312 of process 310 associated with request 308. Operations contract manager 126 can, in turn, provide flash manager instruction 314. Flash manager instruction 314 can be based upon flash manager 126 comparing priority level 312 to the priority level of active process 306. Alternatively, instruction 314 can be based upon current QoS of storage array 122 or any combination thereof established during the most current negotiation session.

Figure 2B:
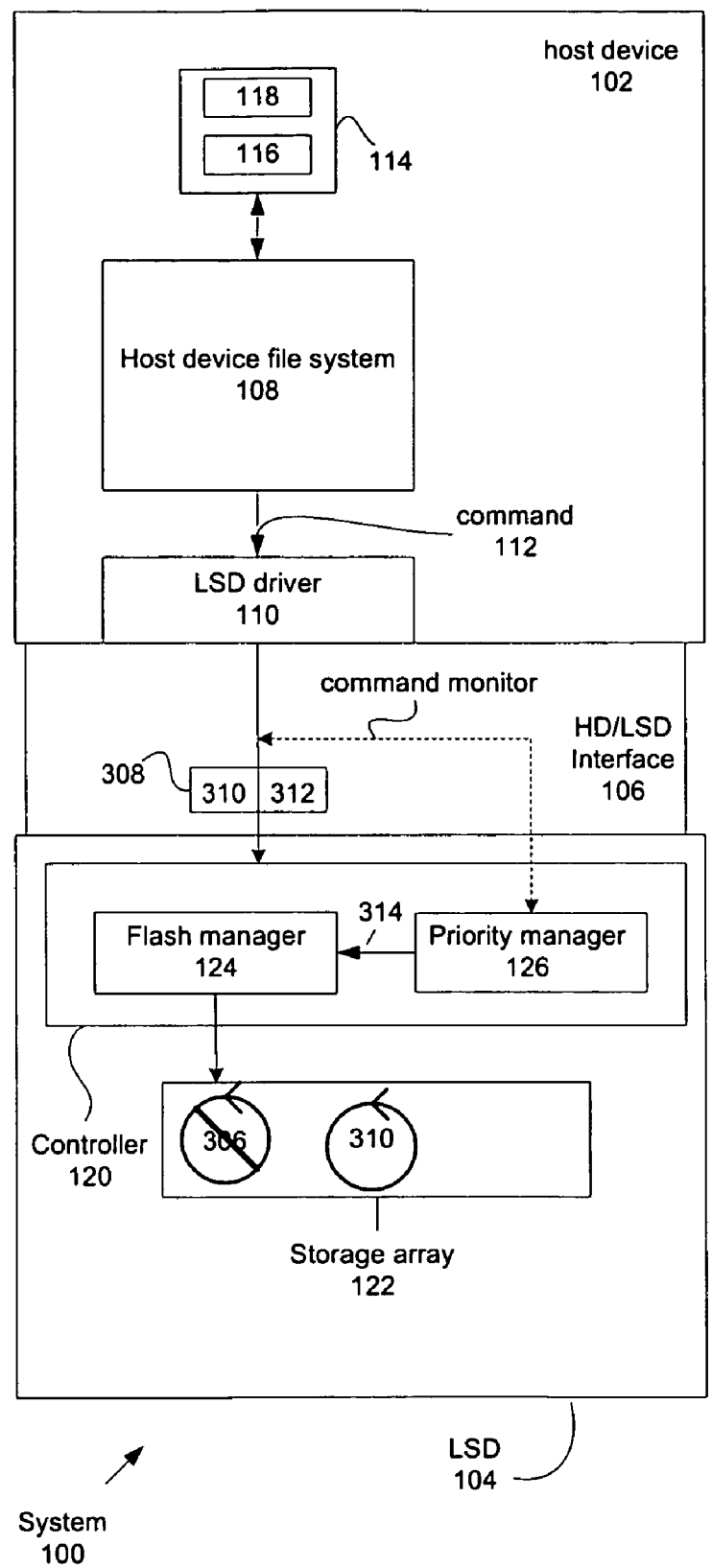

Instruction 314 can cause Flash manager 124 to take any number of actions. For example, if operations contract manager 126 determines that priority 312 of request 308 is a higher priority than that associated with active process 306, then instruction 314 can cause Flash manager 124 to freeze (i.e., suspend) or even abort active process 306 and execute process 310 in its place as illustrated in FIG. 2B. It should be noted that in the case where active process 306 is suspended, Flash manager 124 can take additional measures to assure that once suspended 306 is activated after the completion of process 310, process 306 can be successfully completed. The additional measures can include, for example, storing current state parameter for process 306 which is then made available to process 306 when needed. The storing current state parameters can include storing data to storage array 122 or even to HD 102 if necessary. Whether a process is suspended or aborted can depend upon factors such as the current state of the process. For example, if the active process is a write operation, then whether the write process is aborted or suspended can depend upon the amount of data written to LSD 104 and whether or not it would be faster to abort the write process entirely or merely suspend it. This decision can depend upon the amount of time required to store the data that has not been processed for later retrieval in the case of the write process being suspended as opposed to merely initiating a new write process after the higher priority process has completed.

Figure 3:
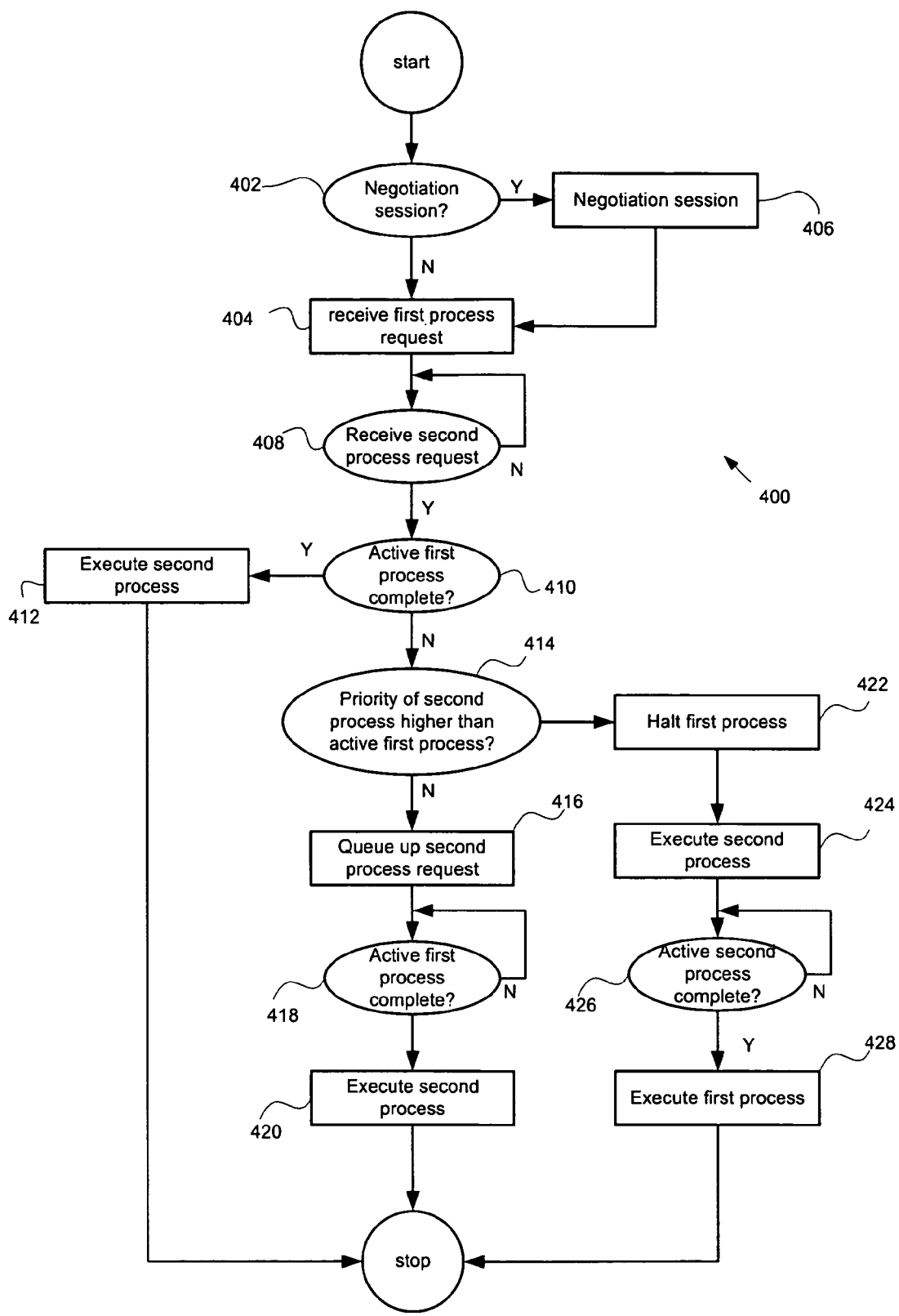
FIG. 3 shows a flowchart describing a process in accordance with the described embodiments.

FIG. 3 shows a flowchart detailing a process 400 in accordance with the described embodiments. The process 400 begins at 402 by determining if a negotiation session is required. If no negotiation session is required, then at 404, a process request is received at the storage device. It should be noted that in some cases, this step can be replaced by the generation of the process request by the HDFS. The process request can include for example, a read request, a write request, an erase request, and so on. If, however, at 404 it is determined that a negotiation session is required, then at 406 a negotiation session is held after which control is passed back to 404. At 408, a determination is made if a second process request has been received. If a second process request has been received, then a determination is made whether or not a first process corresponding to the received process request has completed at 410. If the first process has been completed, then the second process is executed at 412 and process 400 stops. If, however, the first process has not been completed, then a determination is made if the priority of the second process is higher than the priority of the active process at 414. If it is determined that the priority of the active process is higher than the priority of the second process, then at 416, the second process is held until the first process has completed at 418 at which time the second process is executed at 420. If however, it is determined that the second process has a higher priority than the active process, then the active process is halted at 422. It should be noted that the active process can be aborted or suspended depending upon at least the results of the most recent negotiation session. If the active process is aborted, that a flag can be set indicating that the suspended process is queued for execution immediately after the completion of the now active second process. If the first process is suspended, then a suspend flag can be set indicating that additional data must be stored and ultimately retrieved when the suspended second process is activated.

In any case, at 424, the second process is executed and once the second process has completed executing at 426, the first process is executed at 428. It should be noted that anytime during which any process is executing, another process request is received or generated, then operations contract manager can halt a currently active process until such time as all pending higher priority requests have been serviced.

Figure 4:
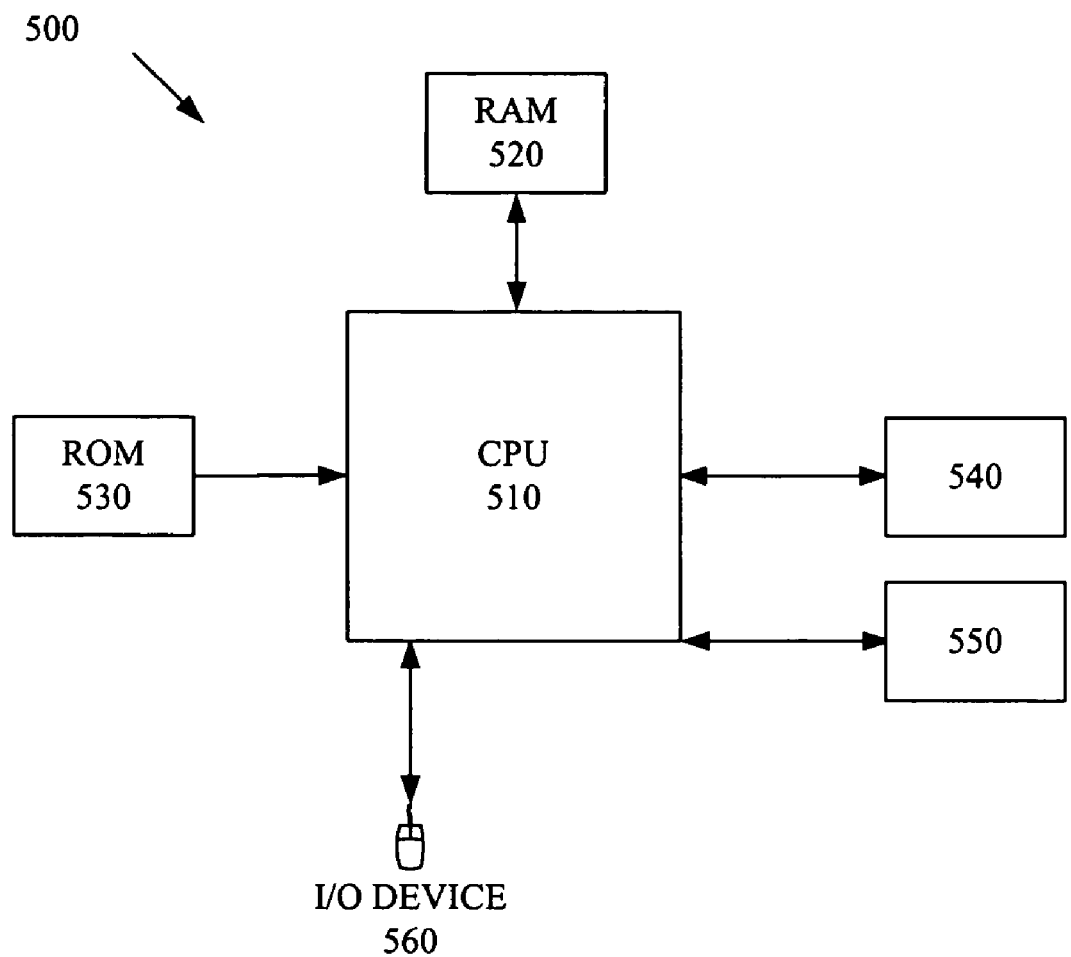
FIG. 4 shows a representative system illustrating additional components typically found in host device

FIG. 4 shows a representative system 500 illustrating additional components typically found in host device 204. System 500 includes central processing unit (CPU) 510, random access memory (RAM) 520, read only memory (ROM) 530, and primary storage devices 540 and 550. As is well known in the art, ROM 530 acts to transfer data and instructions unidirectionally to the CPU 510, while RAM 520 is used typically to transfer data and instructions in a bi-directional manner. CPU 510 may generally include any number of processors. Both primary storage devices 540 and 550 may include any suitable computer-readable media. CPUs 510 are also coupled to one or more input/output devices 560 familiar to those of skill in the computer hardware and software arts.

The invention is suitable for use with both single-level memories and multi-level memories. The memories or memory blocks are data storage devices that include data storage elements. The data storage elements can be based on semiconductor devices (e.g., floating-gate) or other types of devices. In multi-level memories, each data storage element stores two or more bits of data.

The invention can further pertain to an electronic system that includes a memory system as discussed above. Memory systems (i.e., memory cards) are commonly used to store digital data for use with various electronics products. The memory system is often removable from the electronic system so the stored digital data is portable. The memory systems according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

The advantages of the described embodiments are numerous. Different embodiments or implementations may yield one or more of the following advantages. One advantage of the invention is that voltage regulation for electronic products (e.g., semiconductor electronic products) can be provided in a stable and compact manner. Another advantage of the invention is that low power, reliable, high performance memory systems can be obtained.

The many features and advantages of the described embodiments are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A memory device, comprising:
    a data storage array; and
    a data storage array manager arranged to
        conduct communication with a host device to determine host capabilities and identify negotiable terms;
        conduct negotiations with the host device to establish negotiated operational constraints for said negotiable terms to establish an operating contract between the memory device and the host device in communication with the memory device;
        manage a pending management command corresponding to a requested data storage array process received by the memory device from the host device is managed by the data storage array manager based upon relevant terms of the operating contract wherein at least some of the terms are based on operating constraints of the memory device and an associated host device; and
        wherein the priority of various operations are negotiated for negotiable terms to form new operating contracts that determine priorities for said operations wherein said priorities determine an order of execution for said operations and wherein said priorities are subject to change based on changing local storage device operational conditions.

2. A memory device as recited in claim 1, wherein if the operating contract is a static operating contract, then substantially all of the operating terms of the static operating contract are non-negotiable, otherwise wherein if at least one of the terms of the operating contract is a negotiable term, then the negotiable term is established during a negotiation session between the memory device and the host device.

3. A memory device as recited in claim 2, further comprising:
    an operations contract manager that interprets the relevant terms of the operating contract and based upon the interpretation instructs the data storage array manager to act accordingly.

4. A memory device as recited in claim 3, wherein the operations contract manager monitors the data storage array for quality of service (QoS) parameters included in the operating contract.

5. A memory device as recited in claim 3, wherein the operations contract manager directs the data storage array manager to halt a currently active data storage array process in favor of the requested data storage array process based upon the relevant terms of the operating contract.

6. A memory device as recited in claim 5, wherein the halted data storage array is suspended.

7. A memory device as recited in claim 2, wherein the negotiation session is conducted during an initial handshaking operation between the host device and the memory device.

8. A memory device as recited in claim 2, wherein the negotiation session is conducted during runtime.

9. A memory device as recited in claim 1, wherein said operating constraints comprises at least one of priority levels and guaranteed ready times from freeze, and associated sets of QoS parameters.

10. A memory device as recited in claim 1, wherein said data storage manager is configured to negotiate the negotiable terms used to establish the operational constraints of the operation contract between the memory device and an associated host device and wherein said terms include negotiated priority levels for functions supported by the memory device set during a negotiation session between the memory device and the host device.

11. A memory device as recited in claim 10 wherein said negotiated priority levels take into consideration terms that include a guaranteed ready time for functions supported by the memory device set during a negotiation session between the memory device and the host device.

12. A memory device as recited in claim 10 wherein said negotiated priority levels take into consideration terms that include quality of service parameters (QoS) for functions supported by the memory device set during a negotiation session between the memory device and the host device.

13. A memory device as recited in claim 10, wherein said data storage array manager further enables negotiations to occur when there is a need for renegotiation of the priority levels for functions supported by the memory device set during a prior negotiation session between the memory device and the host device.

14. A memory device as recited in claim 1, wherein said data storage array manager further enables further negotiations of operating contract terms when there is a change in QoS parameters for at least one of a the memory device and the host device thereby establishing a renegotiated operating contract.

15. A memory device as recited in claim 1, wherein said data storage array manager further enables negotiations to occur when an application is added to or removed from one of the memory storage device and the host device.

16. A memory device as recited in claim 1, wherein said data storage array manager further enables negotiations to occur when an application is added to or removed from one of the memory storage device and the host device.

17. A system, comprising;
    a host device; and a memory device in communication with the host device, wherein the memory device comprises:

a data storage array; and a data storage array manager arranged to manage the data storage array based upon an operating contract established between the memory device and the host device, wherein a pending management command corresponding to a requested data storage array process received by the memory device from the host device is managed by the data storage array manager based upon relevant terms of the operating contract wherein at least some of the terms of the operating contract are altered by negotiation session, and wherein the priority of various operations are negotiated for negotiable terms to form new operating contracts that determine priorities for said operations wherein said priorities determine an order of execution for said operations and wherein said priorities are subject to change based on changing local storage device operational conditions.

18. A system as recited in claim 17, wherein if the operating contract is a static operating contract, then substantially all of the operating terms of the static operating contract are non-negotiable, otherwise wherein if at least one of the terms of the operating contract is a negotiable term, then the negotiable term is established during the negotiation session between the memory device and the host device.

19. A system as recited in claim 18, further comprising:

a operations contract manager that interprets the relevant terms of the operating contract and based upon the interpretation instructs the data storage array manager to act accordingly.

20. A system as recited in claim 19, wherein the operations contract manager monitors the data storage array for quality of service (QoS) parameters included in the operating contract.

21. A system as recited in claim 19, wherein the operations contract manager directs the data storage array manager to halt a currently active data storage array process in favor of the requested data storage array process based upon the relevant terms of the operating contract.

22. A system as recited in claim 21, wherein the halted data storage array process is aborted.

23. A system as recited in claim 21, wherein the halted data storage array is suspended.

24. A system as recited in claim 18, wherein the negotiation session is conducted during an initial handshaking operation between the host device and the memory device.

25. A system as recited in claim 18, wherein the negotiation session is conducted during runtime.

26. A method of managing concurrent operations with various priority levels in a local storage device, comprising:

at the local storage device, wherein the local storage device includes at least a data storage array and a data storage array manager, managing the data storage array based upon an operating contract established between the memory device and a host device in communication with the memory device, wherein a pending management command corresponding to a requested data storage array process received by the memory device from the host device is managed by the data storage array manager based upon relevant terms of the operating contract wherein at least some of the terms of the operating contract are altered by a negotiation session; and wherein the priority of various operations are negotiated for negotiable terms to form new operating contracts that determine priorities for said operations wherein said priorities determine an order of execution for said operations and wherein said priorities are subject to change based on changing local storage device operational conditions.

27. A method as recited in claim 26, wherein if the operating contract is a static operating contract, then substantially all of the operating terms of the static operating contract are non-negotiable, otherwise wherein if at least one of the terms of the operating contract is a negotiable term, then the negotiable term is established during the negotiation session between the memory device and the host device.

28. A method as recited in claim 27, further comprising:

by an operations contract manager, interpreting the relevant terms of the operating contract; and instructing the data storage array manager to act accordingly.

29. A method as recited in claim 28, wherein the operations contract manager monitors the data storage array for quality of service (QoS) parameters included in the operating contract, wherein the QoS parameters include latency and performance.

30. A method as recited in claim 28, wherein the operations contract manager directs the data storage array manager to halt a currently active data storage array process in favor of the requested data storage array process based upon the relevant terms of the operating contract.

31. A method as recited in claim 30, wherein the halted data storage array process is aborted.

32. A method as recited in claim 30, wherein the halted data storage array is suspended.

33. A method as recited in claim 27, wherein the negotiation session is conducted during an initial handshaking operation between the host device and the memory device.

34. A method as recited in claim 27, wherein the negotiation session is conducted during runtime.

35. A memory device, comprising:

a data storage array;

a data storage array manager arranged to manage the data storage array based upon an operating contract established between the memory device and a host device in communication with the memory device, wherein a pending management command corresponding to a requested data storage array process received by the memory device from the host device is managed by the data storage array manager based upon relevant terms of the operating contract wherein at least some of the terms of the operating contract are altered by a negotiation session;

wherein the priority of various operations are negotiated for negotiable terms to form new operating contracts that determine priorities for said operations wherein said priorities determine an order of execution for said operations and wherein said priorities are subject to change based on changing local storage device operational conditions; and wherein the data storage array manager determines whether a currently active process is one of suspended or aborted.

36. A memory device as recited in claim 35 wherein the data storage array manager determines whether a currently active process is one of suspended or aborted based upon relevant terms of the operating contract.

37. A memory device as recited in claim 35 wherein the data storage array manager determines that currently active process is aborted based upon a determination as to whether it will be faster to abort the active process entirely or to suspend and restart the active process.

38. A memory device, comprising:
- a data storage array; and
- a data storage array manager arranged to manage the data storage array based upon an operating contract established between the memory device and a host device in communication with the memory device, wherein a pending management command corresponding to a requested data storage array process received by the memory device from the host device is managed by the data storage array manager based upon relevant terms of the operating contract; and
- wherein if at least one of the terms of the operating contract is a negotiable term, then the negotiable term is established during a negotiation session between the memory device and the host device wherein at least some of the terms of the operating contract are altered by a negotiation session;
- wherein the priority of various operations are negotiated for negotiable terms to form new operating contracts that determine priorities for said operations wherein said priorities determine an order of execution for said operations and wherein said priorities are subject to change based on changing local storage device operational conditions.

39. A memory device as recited in claim 38 wherein the operational constraints can include at least one of a static priority level, guaranteed ready time from freeze, or an associated set of quality of service (quality of service) parameters.

* * * * *